United States Patent
Cory et al.

(10) Patent No.: US 9,411,882 B2
(45) Date of Patent: Aug. 9, 2016

(54) INTERACTIVE AUDIO CONTENT GENERATION, DELIVERY, PLAYBACK AND SHARING

(71) Applicant: Dolby Laboratories Licensing Corporation, San Francisco, CA (US)

(72) Inventors: Gabriel Grant Cory, San Francisco, CA (US); Joel Robert Kustka, San Francisco, CA (US); Stephen D. Vernon, Hillsborough, CA (US); Ian Eric Esten, San Francisco, CA (US); Sophia Genung Poirier, San Francisco, CA (US); Dossym Nurmukhanov, South San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/334,802

(22) Filed: Jul. 18, 2014

(65) Prior Publication Data
US 2015/0025664 A1    Jan. 22, 2015

Related U.S. Application Data

(60) Provisional application No. 61/857,121, filed on Jul. 22, 2013.

(51) Int. Cl.
*G06F 17/00* (2006.01)
*G06F 17/30* (2006.01)
(Continued)

(52) U.S. Cl.
CPC .......... *G06F 17/3074* (2013.01); *G10H 1/0025* (2013.01); *G10H 1/46* (2013.01); *G10L 19/008* (2013.01); *H04S 7/30* (2013.01); *G10H 2210/131* (2013.01); *H04S 2400/11* (2013.01)

(58) Field of Classification Search
CPC ............. G10L 19/008; H04N 13/0062; H04N 13/0066; H04N 21/235; H04N 21/2353; H04L 29/08711; H04L 67/2804; G06F 17/3074; H04S 2400/11
See application file for complete search history.

(56) References Cited

U.S. PATENT DOCUMENTS

| 7,709,723 B2 | 5/2010 | Pachet |
| 7,855,334 B2 | 12/2010 | Yamashita |

(Continued)

FOREIGN PATENT DOCUMENTS

| KR | 2008-0065499 | 7/2008 |
| WO | 2004/059615 | 7/2004 |

(Continued)

OTHER PUBLICATIONS

Graef, A. et al "Public Report of WP6 Authoring" IST Project "SemanticHIFI" Dec. 12, 2006.

(Continued)

*Primary Examiner* — Andrew C Flanders

(57) ABSTRACT

Control data templates are generated independent of a plurality of audio elements based on user input. The user input relates to parameter values and control inputs for operations. In response to receiving audio elements after the control data templates are generated, audio objects are generated to store audio sample data representing the audio elements. Control data is generated based on the parameter values and the control inputs for the operations in the control data templates. The control data specifies the operations to be performed while rendering the audio objects. The control data is then stored separately from the audio sample data in the audio objects. The audio objects can be communicated to downstream recipient devices for rendering and/or remixing.

20 Claims, 6 Drawing Sheets

(51) Int. Cl.
   *G10L 19/008*   (2013.01)
   *H04S 7/00*     (2006.01)
   *G10H 1/00*     (2006.01)
   *G10H 1/46*     (2006.01)

(56) References Cited

U.S. PATENT DOCUMENTS

| | | | |
|---|---|---|---|
| 7,945,142 B2 | 5/2011 | Finkelstein | |
| 8,426,715 B2 | 4/2013 | Bregar | |
| 2009/0157750 A1* | 6/2009 | Kim | G11B 27/3027 |
| 2010/0050854 A1 | 3/2010 | Huet | |
| 2010/0076577 A1* | 3/2010 | Lee | G10L 19/008 |
| | | | 700/94 |
| 2010/0211200 A1 | 8/2010 | Kobayashi | |
| 2010/0274817 A1 | 10/2010 | Choi | |
| 2011/0040395 A1* | 2/2011 | Kraemer | G10L 19/00 |
| | | | 700/94 |
| 2011/0064249 A1* | 3/2011 | Jang | G11B 27/034 |
| | | | 381/119 |
| 2011/0075851 A1 | 3/2011 | Leboeuf | |
| 2012/0059492 A1* | 3/2012 | Radford | H04H 60/04 |
| | | | 700/94 |

FOREIGN PATENT DOCUMENTS

| | | |
|---|---|---|
| WO | 2007/086417 | 8/2007 |
| WO | 2011/044153 | 4/2011 |
| WO | 2012/089313 | 7/2012 |
| WO | 2012/104119 | 8/2012 |

OTHER PUBLICATIONS

Lagadec, O. et al "iKlax Requirements for MPEG Interactive Music" MPEG Meeting Motion Picture Expert Group or ISO/IEC JTC1/SC29/WG11, Jul. 18, 2008.

Dubspot: "Dubspot Tutorial: How to MIDI Map LED Lights with Ableton Live + DMXis", Apr. 18, 2013, 2 pages, retrieved from the Internet: www.youtube.com/watch?v=SQAQtS8zIIQ (retrieved on Apr. 15, 2016).

* cited by examiner decode a plurality of audio objects into audio sample data and control data 222 while rendering the plurality of audio objects, perform the plurality of operations at occurrences of a plurality of control input specified in the control data 224

FIG. 2B decode a plurality of audio objects into audio sample data and control data 242 make one or more modifications to the control data so that a portion of the control data related to at least one operation in the plurality of operations is changed 244

FIG. 2C

INTERACTIVE AUDIO CONTENT GENERATION, DELIVERY, PLAYBACK AND SHARING

CROSS REFERENCE TO RELATED APPLICATIONS

This application claims the benefit of U.S. Provisional Application No. 61/857,121 filed Jul. 22, 2013, which is hereby incorporated by reference in its entirety.

TECHNOLOGY

The present invention relates to interactive audio content generation, delivery, playback, and sharing, and in particular to applying control data templates to interactive audio content generation, delivery, playback, and sharing.

BACKGROUND

Audio production tools typically require a large amount of manual input and intervention from mixing engineers in order to create a complex audio soundscape in an audio or audio-visual product. In a typical audio mastering session, a mixing engineer has to perform a large number of detailed manipulations perhaps even for a single audio track in a large number of audio tracks involved in giving rise to a final audio mix. Audio tracks rendered with the mixing engineer's detailed manipulations in real time can be recorded and mastered to produce a final audio mix (etc., a cinema version, a consumer version, a broadcast version, etc.).

Because this process requires a large amount of manual input and intervention for potentially a large number of audio tracks for a number of versions, there can be a significant number of errors, inaccuracies, inconsistencies, etc., in timing, sound source positioning, echo, loops, volumes, tones, etc., in a final audio mix as produced by these audio production tools.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A through FIG. 2C illustrate example process flows; and

DESCRIPTION OF EXAMPLE EMBODIMENTS

Figure 1A:
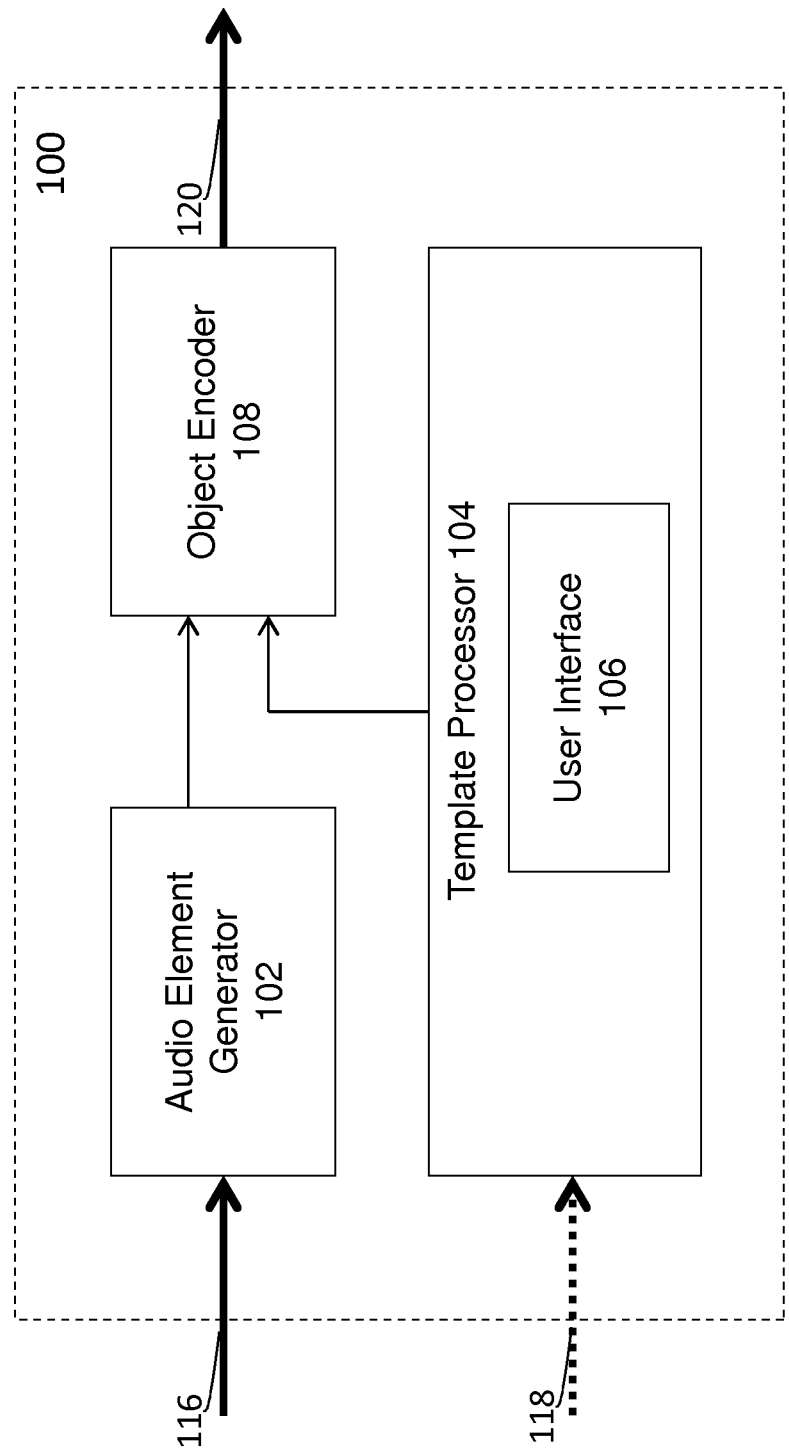
FIG. 1A and FIG. 1B illustrate an example media encoding system and an example media decoding system, respectively.

Example embodiments, which relate to interactive audio content generation, delivery, playback and sharing, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MEDIA PROCESSING SYSTEMS
3. TEMPLATE GENERATION WITH CONTROL INPUT OR TRIGGER
4. AUTHORING USING SEQUENCING
5. USING CONTROL DATA TEMPLATES FOR GPIO FUNCTIONS
6. RECIPIENT SYSTEMS
7. REMIXING
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein enable a user (e.g., a mixing engineer, an audio artist, an audio professional, a music lover, etc.) to interact with a media processing system (e.g., upstream device, a downstream device, a studio system, an audio authoring system, a system in music bar, a personal computer, a server, a workstation, a media processing system, etc.) as described herein to create complex audio soundscapes in relatively simple efficient audio creation workflows.

The user can direct the system to generate control data templates independent of audio elements to which any of the control data templates is to apply. Subsequently, the user can further direct the system to apply any of the control data templates to any of the audio elements in order to produce an audio content mix that can be delivered to downstream devices.

Upon receiving user input that specifies one or more of control data values, operational parameter values, etc., the system can generate, based on the user input, one or more control data templates independent of audio elements. As a control data template is created independent of audio elements, the user need not manually marking any explicit time point in a time sequence of any audio element at the time of creating the control data template.

Examples of control data templates as described herein include, but are not limited to, any of: audio control data templates for panning, volume adjustments, equalization changes, etc., non-audio control data templates for controlling a single light, a bank of lights, light luminance, light color, light flashing rate, image display, image movement, etc.

A control data template may be stored in a control data repository so the template can be later retrieved, updated, removed, and/or applied, for example, by one, two or more users, to a variety of audio elements that already exist or will exist. A plurality of control data templates may be grouped into, and stored as, one or more control data template libraries so that each of the one or more control data template libraries can be separately (e.g., individually, in a combination of some or all of the control data template libraries, etc.) accessed for the purpose of applying any (e.g., selected, etc.) control data templates stored in that control data template library to one or more (e.g., selected, etc.) audio elements.

Under techniques as described herein, a system can efficiently interact with a user and accurately apply any of the control data templates to individual audio elements and/or to individual portions of an audio element among a number of audio elements, even if the number of audio elements is relatively large. Detailed synchronization data between instances of the control data templates and the audio elements can be automatically and accurately generated to tie audio control data, non-audio control data, etc., from a specific control data template with specific time points in time sequences of specific audio elements or with specific portions of a specific audio element.

In some embodiments, at the time of creating a control data template, a user can simply specify a control input (e.g., a trigger, etc.) that triggers performing operations (e.g., generating control events, altering audio features, generating synchronized lighting, etc.) specified with control data in the control data template. When the control data template is selected by a user to apply to one or more audio elements, the user does not need to explicitly mark time points in one or more time sequences of the audio elements, but rather the system can automatically process the audio elements to determine zero, one or more time points in any of the time sequences of the audio elements at which time points the control input should occur, and generate detailed control data for the audio elements to cause performance of operations as specified with the control data at these time points at which the control input occurs.

As a result, under techniques as described herein, appropriate control data can be automatically, efficiently, uniformly and accurately placed/integrated across different time portions of an audio element or across a number of audio elements, for example, according to a user's creative intent, without the user explicitly marking time points in the audio element(s) in a real-time authoring session. Timing of operations specified with the control data can be made with a high accuracy in reference to timing of occurrences of control inputs, for example, within one or more nanoseconds, within one or more microseconds, etc. Durations of these operations can also be accurately and automatically maintained, scaled, stretched or shrunk in reference to duration-types of control input (e.g., tempo, beat, measure, etc.).

In some embodiments, multiple control data templates can be efficiently and automatically applied to one or more audio elements once a user selects the templates and the audio elements. Control data from the multiple control data templates essentially form a time sequence of operations (e.g., control events, etc.) accurately scheduled to be triggered at a plurality of respective time points in the time sequences of the audio elements.

A variety of object-based audio formats may be used to encode audio sample data (e.g., PCM data, etc.) representing audio elements and (e.g., non-PCM data, audio metadata, non-audio metadata, etc.) operational data as specified by control data in control data templates—which have been applied to the audio elements—into a plurality of audio objects. In some embodiments, control data templates (e.g., fully populated, partially populated, etc.) can also be encoded in the audio objects. None, some, or all of the audio objects may comprise control data or control data templates that can be overridden by a recipient device or even by an end-user. The plurality of audio objects may constitute or represent one of a working version, a studio version, a pre-release version, a release version, an intermediate version, a cinema version, a home theater version, etc. Audio objects as described herein can be encoded, for example with Dolby Atmos technologies developed by Dolby Laboratories, Inc. of San Francisco, Calif., etc., transmitted, broadcast or downloaded to the downstream devices in a media data bitstream, stored in a media file, etc. A downstream recipient device can decode a media data bitstream as described herein and retrieve audio sample data and operational data for rendering or further manipulation.

Audio control data, which specifies audio-related operations scheduled to be triggered while rendering audio content, may be decoded from audio objects by a downstream recipient device with an audio playback engine, etc. The downstream recipient device may use the audio control data to perform operations (e.g., generating audio control events, changing volume level, etc.) when rendering the portion of audio sample data. The downstream recipient may drive one or more speakers of a specific audio channel configuration to generate, based on both audio sample data decoded from the audio objects and the audio control data, sound waves that represent individual audio elements in the audio objects, etc.

The rendering of an audio object, which may represent a multi-channel audio sub-mix, a single source audio, dialogue, music, background, effects, etc., can be advantageously localized to the specific audio channel configuration and therefore may vary among a plurality of different rendering environments such as cinema, outdoors, home, car, etc., which may have very different audio channel configurations. As used herein, the term "audio channel configuration" refers to a configuration of audio channels or audio speakers with spatial, physical, acoustic, frequency response, etc., characteristics specific to a device, a device type, a location, a rendering environment, etc. An audio channel configuration may comprise one to many speakers such as two speakers, 30 speakers, 60 speakers, etc.

Additionally, optionally, or alternatively, non-audio control data specifying non-audio operations such as non-audio control events, lighting, light color change, light source movements, etc., to be performed when rendering the portion of audio sample data may also be decoded from corresponding audio objects by a downstream recipient device with a rendering environment controller system, etc. The downstream recipient device may use the non-audio control data to cause performing the non-audio operations such as related to, for example, a single light, a bank of lights, light luminance, light color, light flashing rate, image display, image movement, other environmental conditions, etc., in a specific rendering environment such as a music bar, cinema, home, handset, etc. The performance of the non-audio operations can be performed in a specific rendering environment while audio content is being rendered or performed in the same rendering environment in a synchronous (e.g., rhythmic-synchronous, time-synchronous, position synchronous, angle-synchronous, control-point-synchronous, etc.) manner.

The performance of non-audio operations in a rendering environment as described herein can be advantageously localized to specific environmental conditions existing in the rendering environment and therefore may vary among a plurality of different rendering environments such as cinema, outdoors, home, car, etc., which may have very different sets of non-audio environment conditions. As used herein, the term "environmental conditions" refers to non-audio facilities, non-audio characteristics, wall displays, image displays, lighting, stage settings, etc., specific to a corresponding rendering environment.

An audio element as described herein may comprise one or more audio tracks. The term "audio track" refers to an input unit of audio data with one or more distinguishing audio-related characteristics. In some embodiments, audio tracks may respectively capture individual audio recordings (or signals) relating to one or more of: microphones, instruments, persons, dialogs, music, background sound, different types of sound emitters, etc. A media authoring system (e.g., a media encoding system, a media processing system, etc.) can select and manipulate a variety of audio tracks and/or audio elements to generate instructions for mixing, pre-processing, post-processing, etc., in recipient media devices.

Instead of providing audio files, bitstreams, sub-bitstreams, etc., in which audio content is entirely represented by audio sample data, under techniques as described herein, audio objects representing control data, control data templates, etc., can be provided to a user of a downstream recipient device such that the user can easily interact with the downstream recipient device to modify the control data, control data templates, etc., received with the audio objects. Here, the downstream recipient device may be a playback device which allows interactive manipulation of control data delivered with object-based audio content (e.g., audio objects, etc.). Authoring tools can be configured or installed on such a playback device to alter, create or delete control data.

In some embodiments, mechanisms as described herein form a part of a media processing system, including but not limited to: a handheld device, game machine, television, home theater system, tablet, mobile device, laptop computer, netbook computer, cellular radiotelephone, electronic book reader, point of sale terminal, desktop computer, computer workstation, computer kiosk, various other kinds of terminals and media processing units, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. MEDIA AUTHORING SYSTEMS

FIG. 1A illustrates an example media authoring system 100. The media authoring system 100 may comprise an audio element generator 102, a template processor 104 and an object encoder 108.

In some embodiments, the audio element generator (102) is configured to receive (e.g., to be processed, etc.) audio content 116, and generate, based on the audio content (116), a plurality of audio elements. The audio content may be provided as a plurality of audio tracks. An audio element as described herein may be rendered with sounds emitted from one or more audio channels in an audio channel configuration and may be individually controlled in each of the one or more audio channels independent of other audio elements. Examples of audio elements include but are not limited to: instruments, vocals, dialogue, music, background, sound recordings, synthetic sound, sound effects, etc. In some embodiments, an audio element may comprise one or more audio tracks derived from the audio content (216).

In some embodiments, the template processor (104) comprises a user interface 106 configured to receive user input (118) that can be used to generate control data templates, applying the control data templates to audio elements, etc. Additionally, optionally, or alternatively, in some embodiments, the media authoring system (100) is configured to receive, from other devices, input data that can be used to generate control data templates, applying the control data templates to audio elements, etc.

Upon receiving user input that specifies one or more of control data values, operational parameter values, control input values, etc., the template processor (104) can generate, based on the user input, one or more control data templates independent of audio elements. The phrase "generate . . . independent of . . . " as used herein refers to, but is not limited only to any one of the following scenarios. The media authoring system (100) (or the template processor 104 therein) may create a control data template in the absence of any target audio elements to which the control data template is to apply. The media authoring system (100) may create a control data template prior to receiving any target audio elements to which the control data template is to apply. The media authoring system (100) may create a control data template prior to applying any target audio elements to which the control data template is to apply. The media authoring system (100) may create a control data template contemporaneously with or even after receiving target audio elements to which the control data template is to apply at a time subsequent to the creation of the control data template. As a control data template is created independent of audio elements, the user does not need to manually mark any explicit time point in a time sequence of any audio element at the time of creating the control data template.

The media authoring system (100) may store a control data template in a control data repository so the template can be later retrieved, updated, removed, applied to audio elements, etc. A plurality of control data templates may be grouped (e.g., by the media authoring system 100, by another media processing system configured to generate templates or template libraries for other systems to access, etc.) into, and stored as, one or more control data template libraries so that each of the one or more control data template libraries can be separately (e.g., individually, in a combination of some or all of the control template libraries, etc.) accessed for the purpose of applying any (e.g., selected, etc.) control data templates stored in that control data template library to one or more (e.g., selected, etc.) audio elements.

Under techniques as described herein, a system (e.g., the media authoring system 100, etc.) can efficiently interact with a user and accurately apply any of the control data templates to individual audio elements and/or to individual portions of an audio element among a number of audio elements, even if the number of audio elements is relatively large. For example, the media authoring system (100) may receive user input specifying one or more control data templates, one or more audio elements, etc. Based on the user input, the media authoring system (100) applies one or more control data templates to the one or more audio elements. In some embodiments, the user input may identify a control data template library from which at least one of the one or more control data templates may be derived.

In some embodiments, a control data template can be applied by the media authoring system (100) to one or more specific audio elements to generate (e.g., detailed, etc.) control data including but not limited to synchronization data, etc. Examples of synchronization data include but are not limited only to any of: one or more time-synchronous relationships, one or more position-synchronous relationships, one or more angular-synchronous relationships, one or more control-point-synchronous relationships, etc., between: (1) (e.g., instances of, etc.) the specific control data template, and (2) the one or more specific audio elements or one or more specific portions of any, some or all of the one or more specific audio elements.

In some embodiments, a user can specify (e.g., in user input, via a user interface, etc.) a particular time point/interval in the time sequence of an audio element at which particular time point/interval a control data template is to be applied, or a particular positional point/range of a sound source of an audio element in the time sequence of the audio element at which particular positional point/range a control data template is to be applied, or a particular angular point/range of a sound source of an audio element in the time sequence of the audio element at which particular angular point/range a control data template is to be applied, etc.

In some embodiments, a user can simply specify (e.g., in user input, via a user interface, etc.) a control input (e.g., a trigger, etc.) any occurrence of which can be used to cause performing operations specified in control data in an instance of a control data template in the time sequence of an audio element, without a user explicitly specifying a particular time point at which these instructions would be applied.

A control input to trigger performing operations specified in control data of a control data template can occur at zero, one, two or more time points in a real-time or prospective performance of a corresponding audio element, for example, as a part of an overall audio mix, etc. In some embodiments, as a part of generating synchronization data between a control data template and an audio element, the media authoring system (100) can automatically generate an instance of the control data template for each individual time point of one or more time points, and automatically establish an individual synchronous relationship between each individual instance of one or more instances of the control data template and a respective time point of the one or more time points, so that control data in the individual instance of the control data template can be populated with correct values and related operations can be called to be performed while rendering the audio element at the respective time point. In some embodiments, the system (100) can translate, convert, flesh out, etc., synchronous relationships that are not time-based into explicit time-synchronous relationships in the process of generating synchronous data between an audio element and instances of one or more control data templates. The explicit time-synchronous relationships can be represented, implemented, included, etc., in an audio object that comprises (e.g., encapsulate, link to, etc.) audio sample data representing the audio element and control data from the one or more control data templates as applied to the audio element.

An instance of a control data template can take any one of a variety of forms. In an example, the instance may be a link or reference to the control data template. In another example, the instance may be a partly or fully instantiated copy of the control data template in which operational data values have been populated/generated. In yet another example, at least some control data(s) in the instance may be implemented in a respective portion of audio sample data in the audio element; for example, at least some control data(s) in the control data template may be used to convert a portion of original audio sample data (e.g., original PCM data, etc.) into a portion of converted audio sample data (e.g., converted PCM data, etc.) the latter of which replaces the former in the audio element and is to be delivered to downstream devices.

3. TEMPLATE GENERATION WITH CONTROL INPUT OR TRIGGERS

In some embodiments, techniques as described herein enable artists to author control data with control data templates so that these control data can be efficiently defined in a creative process and accurately locked to the tempo of the associated music of one or more audio elements with a degree of precision that is difficult to achieve via manual control.

For example, the media authoring system (100) can be configured to create, construct, etc., a control data template to hold control data for panning, based on a set of panning-related parameters. Some or all of the panning related parameters may be received by the system in the user input or instruction data from another device. Example panning-related parameters are shown in the following table.

TABLE 1

| Parameters | Description |
| --- | --- |
| overall range | For example, an overall left-right panning might have a range from 0.0 to 1.0, where 0.0 is associated with far left and 1.0 is associated with far right. Similarly, a circular panning might have a numeric range starting from and ending at a reference point. |
| a desired range (e.g., defined by desired start and end points, etc.) | For example, a left-right panning that starts at far left and ends in the center would have a start point of 0.0 and an end point of 0.5. |
| animation function for traversing the desired range | The animation function may be used to control panning motions in terms of speed and direction, and can be based on a simple linear or logarithmic progression, or a more complex physics model, such as a gravity-based model where different parameter values are assigned different masses and locations in space. |
| control input | A control input determines when to trigger performing operations specified in control data in a control data template. In this example, the control input determines when to trigger the animation function and how to traverse its range. The control input may include but is not limited only to any of: External data control protocols (e.g., MIDI, OSC, etc.) |

TABLE 1-continued

| Parameters | Description |
|---|---|
| | Time-based controls (e.g., time codes, time durations of bars, beats, drum patterns, parameters or settings in a digitized audio production environment, etc.) Audio characteristics (e.g., frequency, volume threshold, transients, signal characteristics, etc.) |

A control data template can be produced in any of a variety of methods. For example, a control template for panning may be created with a panning tool that drives the user interface (106) to interact with a user. The panning tool may display a (e.g., rectangular, etc.) area or space that represents the coordinates of a two-dimensional or three-dimensional space such as a stage, a display screen, a side of a room, a location, etc. The user can draw a line in this space that represents the path an object should follow within the space. One or more settable values, functions, etc., in the control data template may have default values, functions, etc. For example, the animation function can be defaulted to a function that traverses the area or space linearly; however, the user can select or define a different animation function by interacting with the panning tool.

The user can select control input in any of a variety of control input modes. Examples of control input include but are not limited only to any of: those related to one or more modes such as MIDI, Beat Sync, etc.

In MIDI mode, a MIDI device can be used to traverse the path by assigning a ranged control to a slider, a rotary knob, etc., in order to control path positions using the slider, rotary knob, etc.

In Beat Sync mode, the user can select the duration for path traversal in reference to notes, e.g. quarter note, whole note, etc. For example, when playing back an audio element to which the panning control data template has been applied, a playback device can use incoming time and meter (e.g., positional, etc.) information to determine the position of an object (e.g., a sound source of the audio element, etc.) on a path. If the user has selected whole note duration at the time of generating the panning control data template, on playback an audio element to which the panning control data template has been applied, the playback device can place the sound source of the audio element at the start of the defined path on every whole note, traverse the sound source of the audio element through 50% of the path at the following half note, and move the sound source of the audio element at the start of the defined path at the end of the path immediately preceding the next whole note.

A control input can also be defined based on inherent audio characteristics such as transients, etc. Transients may coincide with the start of a new note or beat in music. A device (e.g., media authoring system 100, a playback device, etc.) can analyze an audio element or a group of audio elements for transients and use analytical results of transients as a basis to determine when a path should start and/or end. This way, each path would start at the same time a note or a particular section of notes is played in a song.

Similarly, a control data template for looping may be created with a looping tool, which drives the user interface (106) to interact with a user. The looping tool can be configured to create, construct, etc., based on looping control data parameters from user input, the looping control data template. A loop may be an audio clip that will play back seamlessly when repeated, e.g. a drum beat, etc. A loop can be an originally recorded loop; a loop derived from a sample of recording; a loop obtained from a royalty-free library, a loop based on synthesized sound, etc.

The looping control data template can be applied to one or more audio elements (e.g., a song, etc.). Parameters can be easily instantiated and copied to one or more instances of a looping control template to ensure consistency of loops whenever performed. Loops and their associated parameters as specified with the looping control data template can be automatically, accurately, and uniformly applied to, or overlaid with, one or more audio elements, one or more portions of an audio element, etc. In contrast, it could be difficult to perform loops uniformly with other approaches that do not implement the techniques as described herein.

Techniques as described herein can be used to manipulate audio elements in sync with music tempo, beat, etc. In one example, a control data template can be created for producing a delay effect while rendering audio content. The delay effect such as echo, etc., can be configured for, or applied to, audio elements so that each echo occurs on a beat and in time with the music as represented by the audio elements.

Thus, as a part of a creative process that captures a user's creative intent, a control data template can be used to encapsulate control data parameters such as an implicit range, start and end values, an animation path, a control input, etc., in a panning control data template, etc. By abstracting, representing, defining, etc., control data with these control data parameters, it becomes possible to synchronize operation-related control data with music tempo and/or with audio characteristics with a high degree of precision that may not be possible with manually-authored metadata.

Furthermore, parameters (e.g., non-PCM data, operational parameters, configured values for operational parameters, animation functions, default operational parameter values, indicators, flags, etc.) as defined in a control data template such as the panning control data template, etc., can be easily manipulated, scaled, stretched or contracted in time to match the tempo of the music, tie to different types of control inputs, redefined, reused, etc., for example, by one or more of media authoring systems, downstream recipient devices, etc.

4. AUTHORING USING SEQUENCING

A variety of audio elements (e.g., instruments, vocals, etc.) and audio effects (e.g., reverbs, loops, panning, etc.) can be combined together to form a version of audio content mix using techniques as described herein. Control data in control data templates can be applied to the audio elements to modify the volume level, the equalization, and the spatial location of sound source of any of these elements at any given times in the time sequences of the audio elements. These control data may include, but are not limited only to any of: those for controlling audio features (e.g., volume level, spatial position, etc.)—of some or overall audio elements—that are not held constant for the entire performance of the audio content mix. For example, it may be desirable to have certain sounds become louder or softer or to move within a spatial sound field (e.g., a 2D sound field, a 3D sound field, etc.) in a rendering environment over time, for example, depending on relevant audio features of an audio element as determined by the media authoring system 100 in applying a control data template to the audio element, etc. Live or in-studio analysis can be performed on audio content. Features of the audio content as determined in the analysis can be used to define control input (e.g., control events, onset points for operations, etc.). For example, the control input can be defined as the detection of the features, or the detection of a lack of the features, in the audio content. When the control input occurs, operations related to the control input are caused to be performed.

In some embodiments, control data templates specify when in the course of rendering audio content such as a song, etc., a particular sound should be generated and inserted, for how long, etc. Automation controls (e.g., performance of operations as specified with control data, etc.) can be defined in the control data templates and then accurately applied on demand to audio elements while rendering the audio elements.

In some embodiments, a series of spatial panning paths can be created and stored as control data templates. Zero, one, two or more of the control data templates can be used to store control data (or automation data) representing the positions, movements, etc., of the faders, knobs, other audio controls, etc. These positions, movements, etc., of the faders, knobs, other audio controls, etc., can include but are not limited to any of: those manually placed or moved by a user with a MIDI device, those drawn by a user with a time-varying waveform, in which the horizontal axis maps to the playback time position and the vertical axis maps to the fader/knob setting, etc.

The media authoring system (100) can apply time-varying control data/automation data in the control data templates at specific times, and over specific time durations of audio elements, at occurrences of specific control input, etc. Some or all of a set of control data templates can be configured to play back in sequence in sync with a specific triggering sound, based on waveform transient detection. Additionally, optionally or alternatively, some or all of a sequence of control data templates can be triggered to play back in response to one or more asynchronous commands (e.g., MIDI commands, etc.) in live, interactive audio playing applications. Some or all of these control data templates can also be configured to play back in any order, including randomized Multiple different sequences can be created in advance; one of these different sequences may be activated in audio playing applications. Individual sequences can be easily enabled or disabled with different combinations of control data templates and/or control input, allowing the user to change, experiment, implement, use, etc., different sequences such as panning sequences, etc.

Synchronizing the control data templates with audio elements or audio content can be based on sequencing control input or triggers (e.g., an audio feature, a waveform transient detection, a MIDI command, a particular beat or measure in a song, etc.), such that the media authoring system (100) automatically and accurately adapts the control data templates or control data in the templates to fill the intended time period/note duration in the audio elements or audio content. In some embodiments, as an alternative to a user drawing paths in real time as the user authors/produces audio content, the user can instead input step values and assign them to tempo, note duration, an execution sequence, etc. The media authoring system can apply the control data templates to audio elements so that operations specified in the control data in the control data templates can be accurately triggered in sequence when audio content containing the audio elements and the control data is played/rendered/performed.

Techniques as described herein provide flexibility for all types of audio content mixing. These techniques can take advantage of object-based audio formats in which individual audio objects have their own dedicated metadata channels. These dedicated metadata channels can be used to convey control data in control data templates from one module to another module, from an upstream encoding device to a downstream decoding device, etc. With these techniques, it becomes possible for a user to efficiently handle control data authoring of several audio elements at the same time. This can be particularly useful for live, interactive applications, which may involve a large number of complex audio elements.

Audio elements as described herein include non-synthetic audio elements such as recorded audio elements using microphones, physical instruments, etc. Audio elements as described herein also can include synthetic audio elements such as synthesized sounds that might sound like actual instruments—or might sound altogether unnatural. In some embodiments, the media authoring system (100) uses control data templates to generate a wide range of synthetic audio elements using sound samples. For example, a small number of sound samples of a drum kit can be used to create a highly complex rhythm pattern with one or more control data templates.

Control data templates can be applied in a variety of different audio applications. For example, a control data template that follows a particular panning pattern may have utility in a wide range of different musical styles.

Multiple control data templates may be consolidated into a single collection (e.g., one or more library files, etc.) for efficient recall and application of control data templates. A variety of related control data templates may be bundled into a single library, such that the templates as library elements can be easily distributed and/or readily accessed for authoring, remixing, playback, etc. For example, a DJ playing high-energy dance music might want to have a control data template library available that includes dramatic and exciting panning motions, so that application of one of these metadata templates is available with the push of a button. Similarly, a motion picture sound designer working on the soundtrack for a dramatic film might want a control data library of more gradual and realistic panning motions (than dramatic and exciting panning motions) available, in order to apply to environmental sounds such as traffic noises or other incidental sounds.

Control data template libraries provide a simple mechanism for bundling and sharing control data templates among content authors. Having similar or related control data templates bundled into a library provides efficient access to content authors as they create their content. This is particularly important when a content author is creating content on-the-fly as part of a live performance (e.g., a DJ creating live dance music, etc.). Library elements (e.g., control data templates, etc.) from the library can be recalled from a list, assigned to preset pushbuttons on a control surface to enable faster selection, etc.

Techniques as described herein can be of particular interest and usage in the case of object-based audio authoring. In this case, since a content author may be juggling the creation of several different object-based metadata streams simultaneously (e.g., creating control data, other metadata, etc., for several different audio objects simultaneously, etc.), having a library of related control data templates at hand can be very beneficial and handy.

5. USING CONTROL DATA TEMPLATES FOR GPIO FUNCTIONS

Techniques as described herein can be used to create control data templates for performing operations relating to non-audio operations. These non-audio operations include but are not limited to only any of: General Purpose Input/Output (GPIO) functions such as lighting controls, other non-audio events, etc. Non-audio control data can be embedded with audio content (e.g., composition of audio elements, sound effects, etc.) in audio objects in a media data bitstream, media data file, etc. In some embodiments, modifications to the audio content are automatically matched with corresponding modifications to the non-audio control data. In some embodiments, modifications to audio control data for the audio content are also automatically matched with corresponding modifications to the non-audio control data. For example, changes in spatial position of a source of sound, etc., as controlled in part by the audio control data can be automatically mirrored with corresponding changes to spatial position of light display, visual images, etc., as controlled in part by the non-audio control data.

In some embodiments, non-audio operations (e.g., non-audio events, etc.) as specified by non-audio control data are synchronized to audio content (e.g., audio elements, sound effects, etc.) via the use of non-audio control data templates. For example, non-audio control data used to control a single light, a bank of lights, light luminance, light color, light flashing rate, image display, image movement, other non-audio events, etc., can be embedded into and synchronized with the audio content by applying control data templates containing the non-audio control data. When the audio content is played back, non-audio operations (e.g., non-audio events, etc.) as specified by the non-audio control data is issued at appropriate times when related control input occurs, while related audio operations are being performed, while the audio content is being rendered, etc. If a user or a system in charge of audio content reproduction (e.g., a DJ, etc.) decides to play back the audio content in a different sequence, or at a faster or slower tempo, the non-audio operations specified by the non-audio control data are automatically played back in sync.

In some embodiments, a release version of audio content is delivered to a downstream recipient device as a collection of audio objects. The downstream recipient device interprets and plays back audio sample data representing audio elements based on control data embedded in metadata separate from the audio sample data. In some embodiments, an audio element in an audio object is played back with control data in the associated metadata of the audio element; the associated metadata including the control data may be accessed in the same audio object. The control data may include audio control data as well as non-audio control data. In some embodiments, non-audio operations, events, etc., as set forth by the non-audio control data in the control data, can be played back or caused to occur in sync with the audio element or audio content not only temporally but also spatially. For example, a bank of lights controlled by non-audio operations can be triggered to follow the audio element or audio content both in time and in spatial location of a sound source as represented by the audio element or audio content. The non-audio control data is not limited to those related to operations based on spatial positions—the non-audio control data may also include those related to operations based on other measures, parameters, features, controls, etc., such as luminance, color, flashing rate, image displaying, image movements, etc.

In some embodiments, non-audio control data embedded in one or more audio objects in a media data bitstream are used to trigger any visuals to be displayed on multiple monitors. Examples of visuals include but are not limited to only: photos that are assigned to or stored in different channels of object audio metadata of the audio objects, and as the object audio metadata of audio travels (e.g., transmitted, delivered, etc.), so is any visual that is assigned to or stored in a specific channel of the object audio metadata. For example, when a sound source of an audio element enters a defined location, a specific visual can be displayed on a playback device (e.g., a monitor, a display panel, a video wall, an image projection surface, etc.). Thus, non-audio visual effects may be synchronized with positional data (e.g., positions, positional changes, etc.) used to render the audio element in a rendering environment.

Accordingly, techniques as described herein provide new and novel ways of providing a complete sensory experience beyond simply playing back audio content. Control data (e.g., non-audio control data, etc.) for synchronized lighting, non-audio sensory events, light colors, pyrotechnics, smoke machines, curtains opening or closing, etc., can be defined in control data templates and accurately applied to audio elements and portions of an audio element at specific times when control input specified in the control data occurs. Multiple control data templates may be synchronized amongst themselves by sharing common control input. These techniques allow the production of audio-related events, non-audio events without significant, or with much less, manual input and intervention from live technicians. In contrast, under other approaches that do not implement the techniques as described herein, live techniques may be required to carry out non-audio operations; this can be very labor-intensive, and susceptible to missed cues due to human error.

Because non-audio control data can be tied to an audio element among a large number of complex audio elements, non-audio controls can automatically react and change when a change related to the audio element occurs. In contrast, under other approaches that do not implement the techniques as described herein, non-audio aspects of a performance involving audio content are typically required to be choreographed ahead of time; this can be difficult to change the non-audio aspects or patterns once the show or performance involving the audio content begins.

Techniques as described herein are particularly suited for interactive music playback applications, notably including dance nightclubs, etc., in which a DJ may modify a performance significantly from one show to the next based on personal preference, crowd reaction, etc.

As used herein, the term "control data" refers to separate and different audio control/automation data, non-audio control/automation data, etc., from media sample data (e.g., video frames, audio frames or PCM audio samples containing media content, etc.) that represents media content and/or audio content. Control data as described herein may be provided as a part of metadata (e.g., encapsulated in one or more structures in an audio object and/or in a media data bitstream, etc.) separate from media sample data (e.g., encapsulated in one or more other structures in an audio object and/or a media data bitstream, etc.) that may be used to carry audio elements.

As described herein, a media data bitstream can be a part of an overall video bitstream (e.g., for a video program or broadcast, etc.). The media data bitstream can be accessed from a server, a computer, a media storage device, a media database, a media file, etc. The media data bit stream may be broadcasted, transmitted or received through one or more wireless or wired network links. A media data bitstream may also be communicated through an intermediary such as one or more of network connections, USB connections, wide area networks, local area networks, wireless connections, optical connections, buses, crossbar connections, serial connections, etc.

As illustrated in FIG. 1A, the object encoder (108) can be configured to receive audio elements and control data synchronized to the audio elements from the template processor (104) and to encode the audio elements and control data into one or more audio objects in a media data bitstream (120) or at least a portion of such a bitstream.

6. RECIPIENT SYSTEMS

Figure 1B:
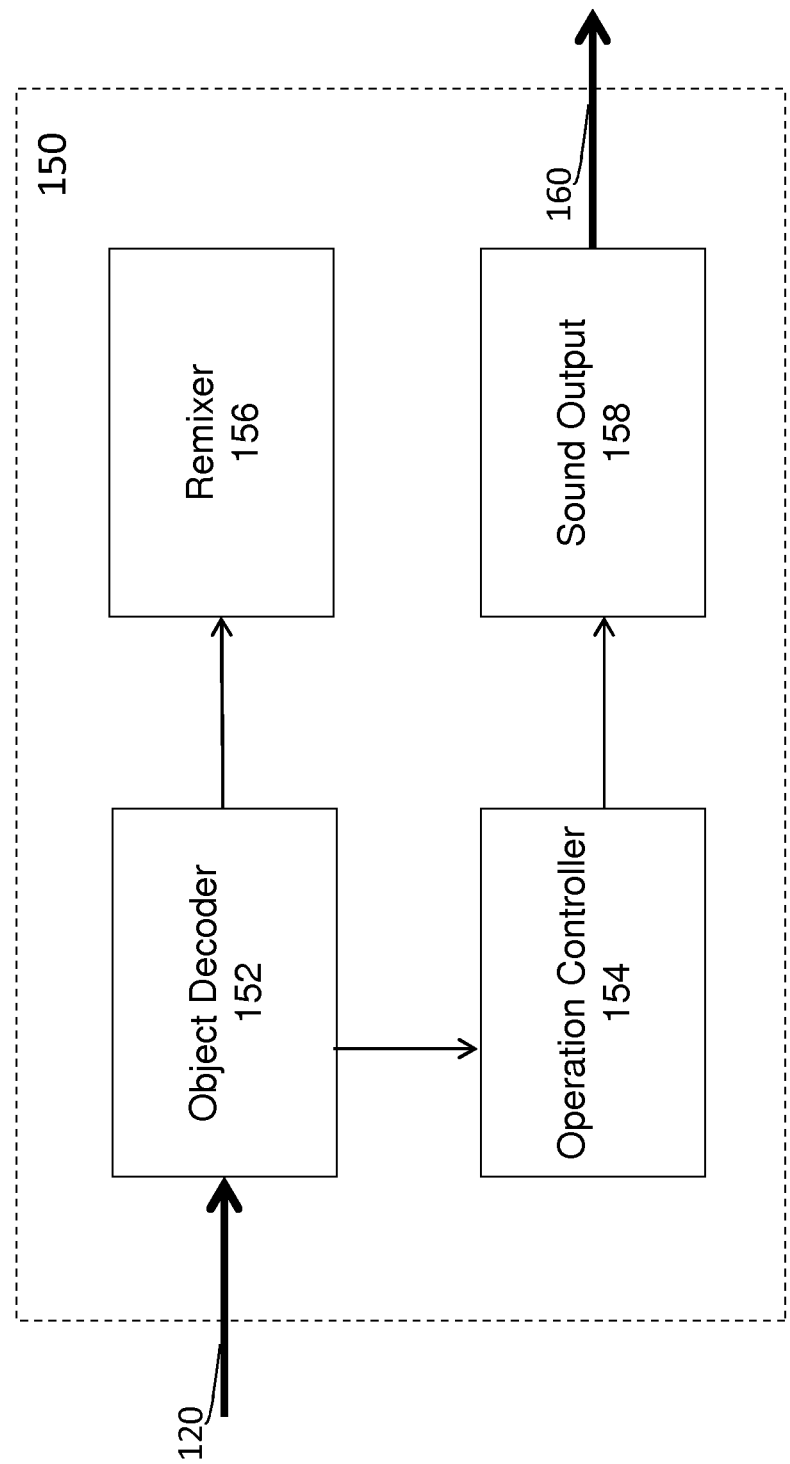

FIG. 1B illustrates an example media decoding system 150. The media decoding system 150 may comprise an object decoder 152, an operation controller 154, a remixer 156, a sound output 158, a non-audio control unit 162, etc. In some embodiments, some or all components of the media decoding system 150 may be a part of, or operate in conjunction with, a playback device.

In some embodiments, the object decoder (152) is configured to receive a media data bitstream (e.g., 120), and decode at least a portion of the bitstream (120) into a plurality of audio objects. In some embodiments, the media decoding system (150) is further configured to decode or retrieve audio elements, control data, synchronous relationships between the audio elements and the control data, etc., from the plurality of audio objects as received in the bitstream (120). In some embodiments, the media decoding system (152) is configured to determine an audio channel configuration that is to be used to render the plurality of audio elements.

In some embodiments, the operation controller (154) is configured to perform audio-related operations specified by audio control data in the control data on the audio elements based on audio-related synchronous relationships (e.g., as a part of real-time performance of audio content represented by the received media data bitstream 120, as a part of further mixing or authoring operations of such audio content, etc.), thereby generating an audio mix of the audio elements.

In some embodiments, the sound output (158) is configured to generate (e.g., multi-channel, etc.) channel-specific audio data (160) for the determined audio channel configuration based on the audio mix. The sound output (158) may comprise, or operate in conjunction with, an audio effects processor (not shown) to integrate sound effects (e.g., panning, looping, echo, etc.) with any or all of the audio elements in the channel-specific audio data (160). The multi-channel channel-specific audio data (160) may be used to drive speakers, headphones, etc., represented in the audio channel configuration.

In some embodiments, the control data as decoded or retrieved by the media decoding system (150) comprise non-audio control data for performing non-audio operations (e.g., generating non-audio events, controlling non-audio devices, etc.). In some embodiments, the synchronous relationships between the audio elements and the control data as decoded or retrieved by the media decoding system (150) comprise synchronous relationships between (e.g., spatial features, compositional features, timing features, etc.) the audio elements and non-audio control data. In some embodiments, the synchronous relationships between the audio elements and the control data as decoded or retrieved by the media decoding system (150) comprise synchronous relationships between audio-related operations specified by the audio control data and non-audio operations specified by the non-audio control data. In some embodiments, the media decoding system (152) is configured to determine a rendering environment configuration in which the audio content represented in the media data bitstream (120) is to be rendered or performed. In some embodiments, the operation controller (154) is configured to perform non-audio operations (e.g., generating control signals, outputs, images, etc.) specified by the non-audio control data in sync with the performance of the audio elements based on the synchronous relationships (e.g., as a part of real-time performance of audio content represented by the received media data bitstream 120, as a part of further mixing or authoring operations of such audio content, etc.), thereby, for example, generating non-audio control events in sync with the performance of the audio content. In some embodiments, the operation controller (154) is configured to perform non-audio operations specified by the non-audio control data in sync with the performance of audio-related operations specified by the audio control data based on the synchronous relationships, thereby, for example, generating non-audio control events in sync with audio-related control events.

Additionally and/or optionally, in some embodiments, the media decoding system (150) can be configured to perform other operations relating to preprocessing of the audio content, post-processing of the audio content, the performance of the audio content, the non-audio events, etc.

Any of the components depicted (e.g., FIG. 1A, FIG. 1B, etc.) may be implemented as one or more processes and/or one or more IC circuits (e.g., ASICs, FPGAs, etc.), in hardware, software, or a combination of hardware and software.

Techniques as described herein can be used to concurrently carry control data and other types of instructions for a variety of audio channel configurations corresponding to a variety of different surround sound configurations (e.g., 2.0, 3.0, 4.0, 4.1, 4.1, 5.1, 6.1, 7.1, 7.2, 10.2, etc.) and a variety of different rendering environment configurations (e.g., cinema, park, opera houses, concert halls, bars, homes, auditoriums, etc.). A recipient device as described herein can be configured to mix audio elements into a final audio mix optimized for the particular audio channel configuration, generating non-audio control events optimized for the particular rendering environments or settings, etc.

A variety of types of recipient devices (e.g., media authoring system 100, media decoding system 150, etc.) may receive audio objects in a media data bitstream (e.g., 120, etc.) encoded with the audio elements and control data in one or more of a variety of ways, such as wirelessly, via a wired connection, through a file, via an internet download, etc. Any of these recipient devices may decode the media data bitstream (120) to derive the audio elements and specific control data for the audio elements. A final mix specific to an audio channel configuration and non-audio events specific to a rendering environment may be created by the recipient device (which, for example may operate in conjunction with other devices, etc.). Pre-processing and/or post-processing (e.g., through Dolby Surround technologies, etc.) operations may be optionally performed on the audio elements, the final mix, system components in the recipient device, audio speakers (e.g., volume, frequency response, spatial direction, etc.), display devices, lighting devices, etc., based at least in part on control data received in the audio objects.

7. REMIXING

In some embodiments, control data received with audio elements in audio objects are applied without modification (e.g., as in the cinema use case, etc.). In some embodiments, multiple sets of control data are received with audio elements; a downstream recipient device may be controlled by a user to select/enable one of the multiple sets of control data to be operative with the audio elements.

Object-based audio formats are those in which audio content is distributed as a collection of audio objects, which are combined (e.g., mixed together, etc.) at the time of playback. Audio objects may comprise individual audio elements (e.g., individual instruments, individual vocals, etc.) or mixes of groups of audio elements. Audio objects may include positional features specifying intended locations of sound sources in the audio elements, for example, in a three-dimensional space. The positional features can be used to enable the creation of complex 3-dimensional sound fields at the time of playback of the audio content.

In addition to the positional features, other mix-related audio features, parameters, etc., can also be conveyed with these audio objects. These may include gain levels (e.g., volume, etc.), tone controls (e.g., treble/bass/equalization parameters, etc.), dynamics processing (e.g., compression/expansion, etc.), a variety of more or less sophisticated signal processing parameters (e.g., for reverb, delay, flanging, distortion, etc.), etc. As a result, the audio content can be originally authored as desired by the artist who creates the audio content; if no further manipulation is applied, the audio content can be played back in a consistent manner by a recipient device equipped with an object decoder.

At one extreme, every individual audio element can be conveyed in a separate audio object (which may result in a media data bit stream requiring a very high data rate). At the other extreme, all audio elements can be mixed together beforehand to create a final audio mix, which can then be conveyed as a simple multi-channel object to drive multiple channels in an audio channel configuration.

In some embodiments, audio content in an object-based audio format comprises a combination (e.g., hybrid, etc.) of: (1) zero, one, or more audio sub-mixes, each of which comprises a fixed multi-channel mix (denoted as the "bed"), and (2) one or more dynamic audio elements in specific audio objects. The combination together makes up a complete audio mix for a (e.g., movie, etc.) presentation. For example, a sound processor in a cinema may use positional features in specific audio objects to combine the dynamic audio elements in the specific audio objects with the bed, and thereby create the final output audio mix that is fed to the cinema loudspeakers.

In some embodiments, when a user (e.g., an original artist, an intermediate artist, etc.) releases audio content, a set of original (e.g., default, etc.) control data, control data templates, audio features, audio-related parameters, etc., may be encoded with corresponding audio sample data in the audio content together into a media data bit stream, media data file, etc. In some embodiments, techniques as described herein make use of an object-based audio format that enables efficient delivery/release of audio content such that original (e.g., default, etc.) control data, control data templates, audio features, audio-related parameters, etc., in the audio content can be changed (e.g., remixed, etc.) by an end-user after the audio content has been delivered to the end-user. None, some or all of the original control data, control data templates, audio features, audio-related parameters, etc., can be opened up for end-user manipulations. In some embodiments, the object-based audio format used to deliver audio content supports coding audio elements in the audio content and their corresponding control data, control data templates, etc., that are of interest to remix as individual audio objects in a media data bitstream. The end-user editable original control data, control data templates, audio features, audio-related parameters, etc., can be packaged in audio objects that are individually editable by the end-user or the downstream recipient device, and delivered to a downstream recipient device for rendering as well as for revision prior to playback. Attributes, flags, editable fields/objects, etc., may be used to signal to the end-user or the downstream recipient device which original control data, control data templates, audio features, audio-related parameters, non-PCM data, operational parameters, configured values for operational parameters, animation functions, default operational parameter values, indicators, flags, etc., are eligible for end-user manipulations.

A downstream recipient device (e.g., 150, etc.) that receives the media data bitstream can be configured to allow an end-user (e.g., another artist, another audio professional, a DJ, a consumer, a social network user, etc.) to remix the audio content, for example, by manipulating some or all of the control data, control data templates, audio features, audio-related parameters, non-PCM data, operational parameters, configured values for operational parameters, animation functions, default operational parameter values, indicators, flags, etc., that are eligible for end-user manipulations. In some embodiments, audio sample data in the audio content—which may be a relatively large portion of the audio content—does not need to be modified in remixing operations but rather may be manipulated, altered, rendered when it is played back.

In some embodiments, downstream recipient devices (e.g., media decoding system 150, etc.) can be directed by an end-user to carry out remixing operations to suit personal tastes of users of the downstream recipient devices, for example, to directly manipulate the control data to create new, different and potentially unforeseen expressions (e.g., remixes, etc.) of the audio content relative to the originally produced audio content, to share these expressions with other end-users, studios, artists, etc. In an example, the remixer (156) is configured to provide an end-user an ability to access, modify, override, etc., respective control data relating to individual audio elements (e.g., individual instrument tracks, vocal tracks, etc.) of the audio content. Accordingly, an audio element (e.g., an audio track, etc.) in a remix or expression of the audio content can sound notably different from a corresponding audio element (e.g., the original track) in the originally produced release of the audio content. In another example, the remixer (156) is configured to provide an end-user an ability to access, modify, override, etc., individual control data templates so that an of an overridden control data template receive the same changes as other instances of the same template. Accordingly, audio control data, non-audio control data in the overridden control data template can be uniformly, consistently, etc., applied to all instances of operations specified in the control data wherever applied in the audio elements; a user does not need to change each instance of operations specified in control data one at a time.

In some embodiments, results of an end-user's remixing of the audio content comprise no change/modification to the audio sample data. The object-based audio format can be defined in such a way that changed control data by one end-user can be efficiently shared with other end-users through various ways of communications. For example, changes in an end-user's remix to the control data, control data templates, audio features, audio-related parameters, etc., can be captured in a relatively small (e.g., as compared with the size of the audio sample data, as compared with overall size of the audio content in the media data bitstream, etc.), separately deliverable media data bitstream, media data file, media data container, media data structure, etc., to enable efficient sharing of the results of the end-user's remixing of the audio content. Other users may have a release of the audio content that comprises the audio sample data and originally released control data. Thus, with the changes as captured in the relatively small media data bitstream, media data file, media data container, media data structure, etc., the other users will be able to combine these changes with the audio sample data and originally released control data to reproduce, render, etc., the remix created by the user.

As a result, end-users can create their own remixes and post the remixes as comparatively small control data files for sharing with other users in one or more of a variety of remix-related data repositories including but not limited to web-based repositories. These repositories may include, without limitation, a number of popular music services (e.g., iTunes, Pandora, XM Radio, etc.) currently delivering large volumes of digital music content to consumers using well-established music delivery formats (e.g., MP3, AAC, etc.). The object-based audio format may be created by extending the capabilities of one or more of these delivery formats. Additional capabilities such as multi-channel support (e.g., more powerful than the standard two-channel stereo support, DVD-Audio, etc.) may be implemented with one or more of object-based audio formats under techniques as described herein.

Techniques for remixing as described herein can be used by end-users as well as original artists and other users. In some embodiments, remixing by users as described herein can be done without specialized and expensive equipment. For example, using the same or similar techniques, the original artists themselves may want to create multiple release versions representing a variety of remixes. Some of these versions may be alternative versions of the most popular releases. A large number of remix tracks from a wide variety of hip hop, rock, pop artists, etc., can be made with these techniques. In addition, techniques as described herein can be used by users such as artists, producer, DJs, etc., to create music mixes ahead of time, which can then be played back in various venues such as music bars, dance clubs, etc., in front of audiences. Techniques as described herein can also be used to enable the users to modify music mixes on-the-fly at their own discretions and in conjunction with reactions of the audiences. The users can be allowed to access and modify zero, some of all control data relating to a set of component audio elements in a media data bitstream, media data file, etc.

8. EXAMPLE PROCESS FLOWS

Figure 2A:
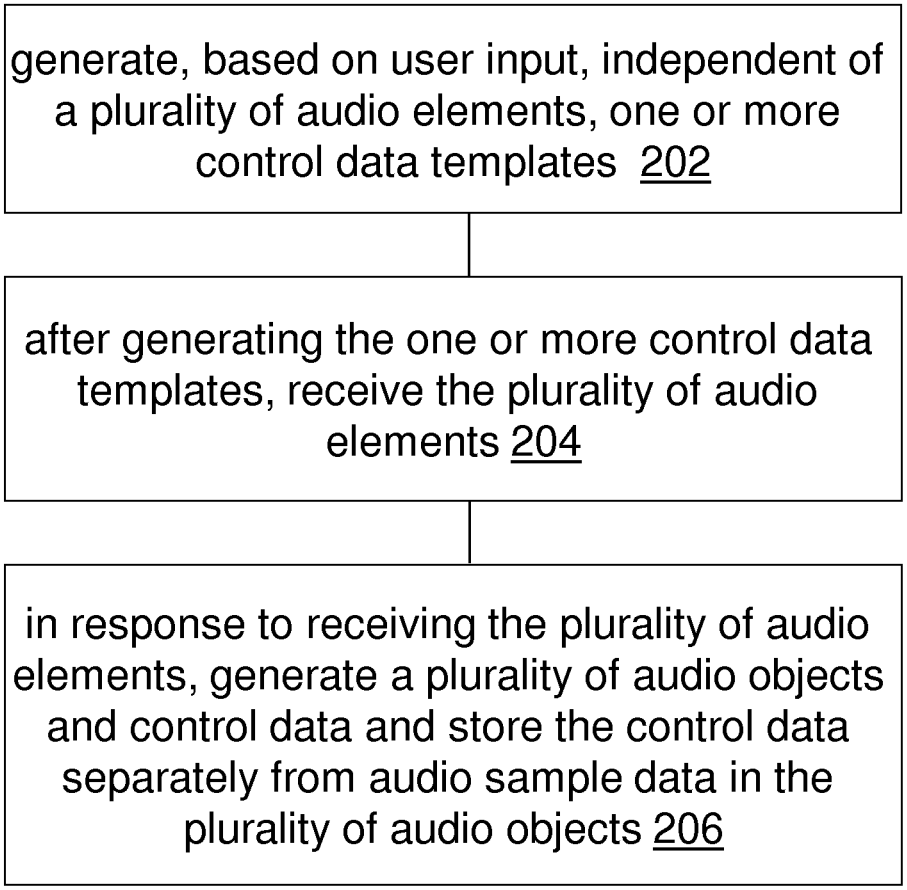

FIG. 2A, FIG. 2B and FIG. 2C illustrate example process flows. In some embodiments, one or more computing devices or units in a media processing system may perform this process flow.

FIG. 2A illustrates an example process of generating audio objects by applying control data templates to audio elements. In block 202 of FIG. 2A, a first device (e.g., a media authoring system 100 of FIG. 1A, etc.) generates, based on user input, independent of a plurality of audio elements, one or more control data templates. The user input relates to a plurality of parameter values and a plurality of control inputs for a plurality of operations. The one or more control data templates comprises the plurality of parameter values and the plurality of control inputs for the plurality of operations.

In block 204, after generating the one or more control data templates, the first device receives the plurality of audio elements.

In block 206, in response to receiving the plurality of audio elements, the first device generates a plurality of audio objects to store audio sample data representing the plurality of audio elements; generates control data based on the plurality of parameter values and the plurality of control inputs for the plurality of operations, the control data specifying the plurality of operations to be performed while rendering the plurality of audio objects; and stores the control data separately from the audio sample data in the plurality of audio objects.

FIG. 2B illustrates an example process flow of decoding and rendering audio objects. In block 222 of FIG. 2B, a second device (e.g., a media decoding system 150 of FIG. 1B, etc.) decodes a plurality of audio objects into audio sample data representing a plurality of audio elements and control data specifying a plurality of operations to be performed at occurrences of respective control inputs a plurality of control inputs while rendering the plurality of audio objects.

In block 224, while rendering the plurality of audio objects, the second device performs the plurality of operations at occurrences of a plurality of control input specified in the control data decoded from the plurality of audio objects.

FIG. 2C illustrates an example process flow of decoding and remixing audio objects. In block 242 of FIG. 2C, a third device (e.g., a media decoding system 150 of FIG. 1B, etc.) decodes a plurality of audio objects into audio sample data representing a plurality of audio elements and control data specifying a plurality of operations to be performed at occurrences of respective control inputs a plurality of control inputs while rendering the plurality of audio objects.

In block 244, the third device makes one or more modifications to the control data so that a portion of the control data related to at least one operation in the plurality of operations is changed.

In an embodiment, the plurality of audio elements as described herein may be generated based at least in part on one of: premixing audio tracks or decoding previously mixed audio data.

In an embodiment, the first device is configured to further perform outputting the plurality of audio objects to a downstream media device in one of media data bitstreams, audio signals, audiovisual signals, media data files, media data containers, or media data structures.

In an embodiment, the plurality of audio elements as described herein may be a part of media data comprising one or more of: audio content only, video content only, both audio content and video content, etc.

In an embodiment, the control data as described herein specifies one or more of audio-related operations and/or non-audio operations.

In an embodiment, the control data as described herein is at least partially editable without causing changes to the audio sample data by a recipient device to create a remix different from an original mix represented by the plurality of audio objects.

In an embodiment, at least one operation in the plurality of operations as described herein is synchronized to one or more occurrences of a control input in the plurality of control inputs when the plurality of audio objects is rendered.

In an embodiment, the plurality of operations as described herein comprises a sequence of operations each of which is caused to be performed at an occurrence of a respective trigger in the sequence of triggers. In an embodiment, the sequence of triggers occurs with one or more of particular beats, particular measures, or particular time periods, in audio content represented by the plurality of audio objects.

In an embodiment, a time duration of an operation in the plurality of operations is scaled to fill a time duration of one or more of particular beats, particular measures, or particular time periods, in audio content represented by the plurality of audio objects.

In an embodiment, the first device is configured to further perform storing the plurality of control data templates into a data repository as a set of individually accessible control data template libraries.

In an embodiment, the plurality of operations as described herein comprises one or more non-audio operations. In an embodiment, at least one of the one or more non-audio operations is synchronized with one or more occurrences of a control input relating to an audio element in the plurality of audio elements. In an embodiment, at least one of the one or more non-audio operations is synchronized with one or more occurrences of a control input relating to an audio operation in the plurality of operations.

In an embodiment, the second device is configured to further perform receiving the plurality of audio objects at a downstream media device in one of media data bitstreams, audio signals, audiovisual signals, media data files, media data containers, or media data structures.

In an embodiment, at least one of the one or more non-audio operations as described herein is performed in sync with one or more occurrences of a control input relating to an audio element in the plurality of audio elements.

In an embodiment, at least one of the one or more non-audio operations as described herein is performed in sync with one or more occurrences of a control input relating to an audio operation in the plurality of operations.

In an embodiment, the third device is configured to further perform, while rendering the plurality of audio objects, the at least one operation in the plurality of operations differently than originally specified in the control data as decoded without the one or more modifications.

In an embodiment, the third device is configured to further perform, while rendering the plurality of audio objects, the at least one operation in the plurality of operations at occurrences of a different control input than a control input originally specified in the control data as decoded without the one or more modifications.

In an embodiment, the third device is configured to further perform saving the one or more modifications to the control data without the audio sample data in a separately deliverable one of media data streams, media data files, media data containers, or media data structures.

In an embodiment, an apparatus comprising a processor and configured to perform any one of the methods as described herein.

In an embodiment, a non-transitory computer readable storage medium, comprising software instructions, which when executed by one or more processors cause performance of any one of the methods as described herein. Note that, although separate embodiments are discussed herein, any combination of embodiments and/or partial embodiments discussed herein may be combined to form further embodiments.

9. IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
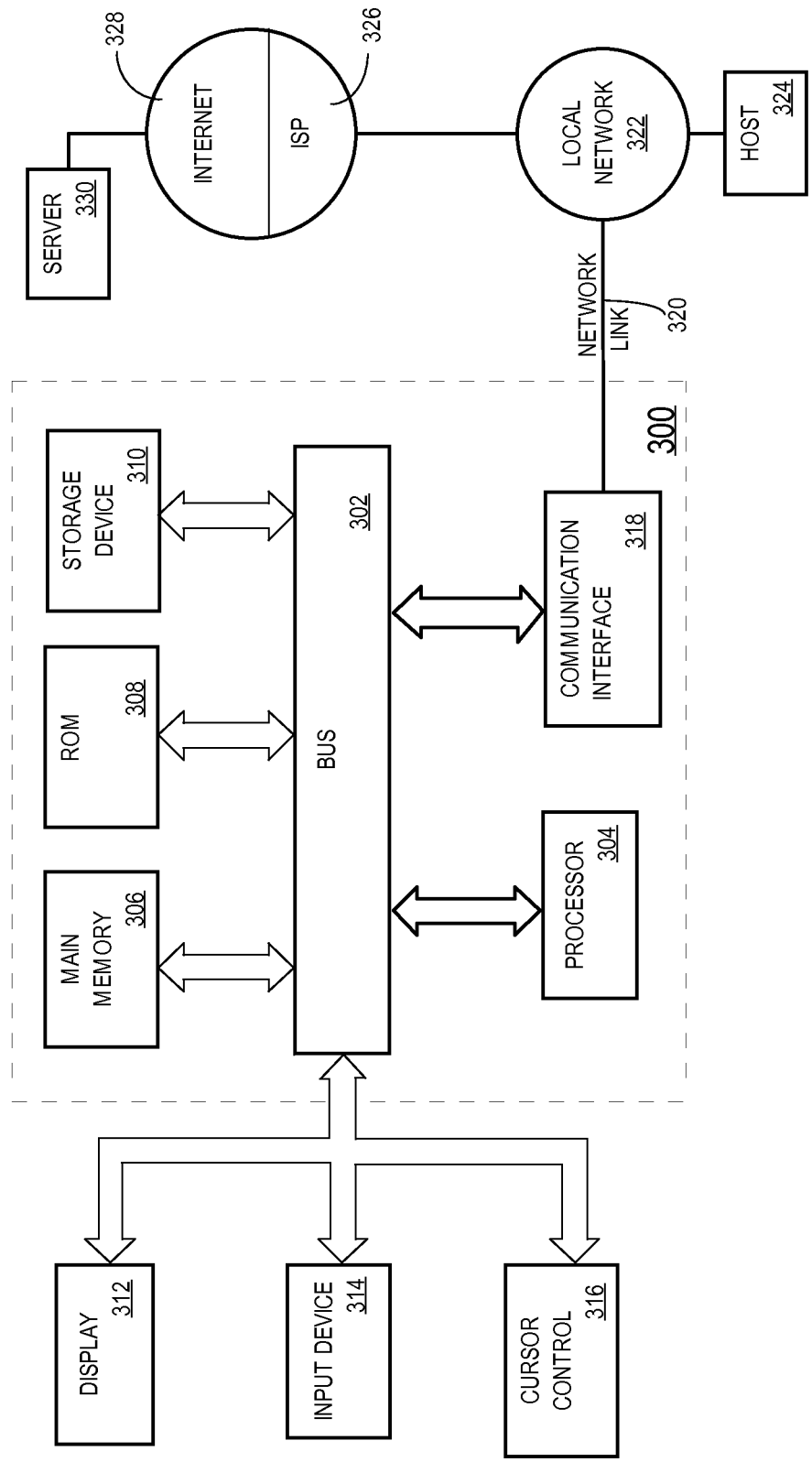
FIG. 3 illustrates an example hardware platform on which a computer or a computing device as described herein may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is device-specific to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using device-specific hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

10. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, feature, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   generating, based on user input, independent of a plurality of audio elements, one or more control data templates, the user input relating to a plurality of parameter values and a plurality of control inputs for a plurality of operations, the one or more control data templates comprising the plurality of parameter values and the plurality of control inputs for the plurality of operations;
   wherein the one or more control data templates are generated, before the one or more control data templates are applied to the plurality of audio elements to create a plurality of audio objects storing audio sample data representing the plurality of audio elements;
   after generating the one or more control data templates, receiving the plurality of audio elements; and
   in response to receiving the plurality of audio elements,
      creating the plurality of audio objects to store the audio sample data representing the plurality of audio elements;
      generating control data based on the plurality of parameter values and the plurality of control inputs for the plurality of operations, the control data specifying the plurality of operations to be performed while rendering the plurality of audio objects; and
      storing the control data separately from the audio sample data in the plurality of audio objects;
   wherein the method is performed by one or more computing devices.

2. The method as recited in claim 1, wherein the plurality of audio elements is generated based at least in part on one of: premixing audio tracks or decoding previously mixed audio data.

3. The method as recited in claim 1, further comprising outputting the plurality of audio objects to a downstream media device in one of media data bitstreams, audio signals, audiovisual signals, media data files, media data containers, or media data structures.

4. The method as recited in claim 1, wherein the control data is at least partially editable without causing changes to the audio sample data by a recipient device to create a remix different from an original mix represented by the plurality of audio objects.

5. The method as recited in claim 1, wherein at least one operation in the plurality of operations is synchronized to one or more occurrences of a control input in the plurality of control inputs when the plurality of audio objects is rendered.

6. The method as recited in claim 1, wherein the plurality of operations comprises a sequence of operations each of which is caused to be performed at an occurrence of a respective trigger in the sequence of triggers.

7. The method as recited in claim 1, wherein a time duration of an operation in the plurality of operations is scaled to fill a time duration of one or more of particular beats, particular measures, or particular time periods, in audio content represented by the plurality of audio objects.

8. The method as recited in claim 1, further comprising storing the plurality of control data templates into a data repository as a set of individually accessible control data template libraries.

9. The method as recited in claim 1, wherein the plurality of operations comprises one or more non-audio operations.

10. A method, comprising:
    decoding a plurality of audio objects into audio sample data representing a plurality of audio elements and control data specifying a plurality of operations to be performed at occurrences of respective control inputs in a plurality of control inputs while rendering the plurality of audio objects;
    wherein the plurality of audio objects are created by an upstream encoder by applying one or more control data templates to the plurality of audio elements;
    wherein the one or more control data templates are generated, before the one or more control data templates are applied to the plurality of audio elements to create the plurality of audio objects storing the audio sample data representing the plurality of audio elements; and
    while rendering the plurality of audio objects, performing the plurality of operations at occurrences of a plurality of control input specified in the control data decoded from the plurality of audio objects;
    wherein the method is performed by one or more computing devices.

11. The method as recited in claim 10, wherein the control data specifies one or more of audio-related operations or non-audio operations.

12. The method as recited in claim 10, wherein the control data is at least partially editable without causing changes to the audio sample data by a recipient device to create a remix different from an original mix represented by the plurality of audio objects.

13. The method as recited in claim 10, wherein at least one operation in the plurality of operations is synchronized to one or more occurrences of a control input in the plurality of control inputs while rendering the plurality of audio objects.

14. The method as recited in claim 10, wherein the plurality of operations comprises a sequence of operations each of which is caused to be performed at an occurrence of a respective trigger in the sequence of triggers.

15. The method as recited in claim 10, wherein a time duration of an operation in the plurality of operations is scaled to fill a time duration of one or more of particular beats, particular measures, or particular time periods, in audio content represented by the plurality of audio objects.

16. The method as recited in claim 10, wherein the plurality of operations comprises one or more non-audio operations.

17. A method, comprising:
    decoding a plurality of audio objects into audio sample data representing a plurality of audio elements and control data specifying a plurality of operations to be performed at occurrences of respective control inputs in a plurality of control inputs while rendering the plurality of audio objects;
    wherein the plurality of audio objects are created by an upstream encoder by applying one or more control data templates to the plurality of audio elements;
    wherein the one or more control data templates are generated, before the one or more control data templates are applied to the plurality of audio elements to create the plurality of audio objects storing the audio sample data representing the plurality of audio elements; and
    generating one or more modifications to the control data so that a portion of the control data related to at least one operation in the plurality of operations is changed;
    wherein the method is performed by one or more computing devices.

18. The method as recited in claim 17, further comprising, while rendering the plurality of audio objects, performing the at least one operation in the plurality of operations differently than originally specified in the control data as decoded without the one or more modifications.

19. The method as recited in claim 17, further comprising, while rendering the plurality of audio objects, performing the at least one operation in the plurality of operations at occurrences of a different control input than a control input originally specified in the control data as decoded without the one or more modifications.

20. The method as recited in claim 17, further comprising saving the one or more modifications to the control data without the audio sample data in a separately deliverable one of media data streams, media data files, media data containers, or media data structures.

\* \* \* \* \*